US006974374B1

(12) United States Patent
Teinert

(10) Patent No.: US 6,974,374 B1
(45) Date of Patent: Dec. 13, 2005

(54) SELF-ADJUSTING GAMBREL

(76) Inventor: Bill Teinert, 3095 County Rd. 251, Hondo, TX (US) 78861

( * ) Notice: Subject to any disclaimer, the term of this patent is extended or adjusted under 35 U.S.C. 154(b) by 0 days.

(21) Appl. No.: 10/820,490

(22) Filed: Apr. 8, 2004

Related U.S. Application Data

(60) Provisional application No. 60/461,508, filed on Apr. 9, 2003.

(51) Int. Cl.[7] ................................. A22B 1/00
(52) U.S. Cl. ........................................ 452/191
(58) Field of Search ................. 452/187–193

(56) References Cited

U.S. PATENT DOCUMENTS

| | | | |
|---|---|---|---|
| 482,633 A * | 9/1892 | Garwick ...................... 452/191 |
| 959,287 A * | 5/1910 | Barrows ...................... 452/191 |
| 1,150,331 A * | 8/1915 | Borkhuis ...................... 452/191 |
| 1,373,823 A * | 4/1921 | McClung ...................... 452/191 |
| 1,503,738 A * | 8/1924 | Young ........................ 452/191 |
| 4,327,633 A | 5/1982 | Leining et al. |
| 5,049,110 A | 9/1991 | Owens |
| 5,236,386 A * | 8/1993 | Dingee ....................... 452/192 |
| 5,288,265 A | 2/1994 | Beason et al. |
| 5,304,091 A * | 4/1994 | Wilkinson .................. 452/192 |
| 5,562,534 A | 10/1996 | McGough |
| 5,591,077 A | 1/1997 | Rowe |
| 5,651,730 A | 7/1997 | McGinnis et al. |
| 5,791,858 A | 8/1998 | Sasser |
| 5,820,455 A | 10/1998 | Breedlove |
| 5,938,521 A | 8/1999 | Jasek et al. |
| 6,186,882 B1 | 2/2001 | Adams et al. |
| 6,250,483 B1 | 6/2001 | Frommer |
| 6,264,544 B1 * | 7/2001 | Mullins ...................... 452/191 |
| 6,626,748 B2 | 9/2003 | Homer |
| 6,695,688 B1 | 2/2004 | Owen et al. |
| 6,705,821 B2 | 3/2004 | Philips et al. |
| 6,712,687 B1 | 3/2004 | Douglas |

* cited by examiner

Primary Examiner—Thomas Price

(57) ABSTRACT

The present invention consists of an gambrel that can be easily and quickly hung from a variety of mounts to allow for quick, safe, reliable field dressing of slaughtered animals. It will automatically adjust to the size and weight of the slaughtered animal. The gambrel has, at most, two pivot points, which enhances the overall strength of the apparatus. It has a weight-bearing lower cross member which operates to distribute the weight of the slaughtered animal across the entire gambrel and provides for additional strength. The gambrel's hooked mounting mechanism also adds versatility in field dressing the animal.

26 Claims, 4 Drawing Sheets

US 6,974,374 B1

SELF-ADJUSTING GAMBREL

This utility patent application takes priority from Provisional patent Application No. 60/461,508 filed Apr. 9, 2003, for "A Self-Adjusting Apparatus for Hanging a Carcass."

BACKGROUND OF THE INVENTION

1. Field of the Invention

Applicant's invention relates to a device for hanging a carcass, allowing a hunter to field dress the animal. More particularly, it relates to a portable gambrel which automatically adjusts to the proper size for the animal being dressed.

2. Background Information

Hunters often desire to field dress an animal they have slaughtered. Field dressing an animal reduces the weight that a hunter must carry making it easier to manipulate and handle. Field dressing also helps prevent contamination. Field dressing is most easily accomplished by suspending the animal by its hind legs via a gambrel. Conventional gambrels are difficult to use because they are overly complex, difficult to mount, do not easily adjust for varying sizes and weights of animals, and have weak joints which collapse when subjected to heavy loads.

SUMMARY OF THE INVENTION

The present invention consists of an apparatus that can be easily and quickly hung from a variety of mounts to allow for quick, safe, reliable field dressing of slaughtered animals.

The present invention provides a novel apparatus that will automatically adjust to the size and weight of the slaughtered animal.

The present invention also provides for, at most, two pivot points which enhances the overall strength of the apparatus.

The present invention further provides for a weight-bearing lower cross member which operates to distribute the weight of the slaughtered animal across the entire gambrel and provides for surpassing strength.

The present invention still further provides for a hooked mounting mechanism which provides for versatility in field dressing the slaughtered animal.

DETAILED DESCRIPTION OF THE PREFERRED EMBODIMENT

Referring to the figures in which like referenced features indicate corresponding elements throughout the several views. The references are:

| | |
|---|---|
| 10 | gambrel |
| 12 | support hook |
| 14 | central bar |
| 16 | upper cross member |
| 16a | upper cross member first plate |
| 16b | upper cross member second plate |
| 18 | upper cross member cylinder |
| 20 | first prong arm |
| 22 | second prong arm |
| 24 | first prong arm pivot |
| 26 | second prong arm pivot |
| 28 | first prong |
| 28a | first prong tapered end |
| 30 | second prong |
| 30a | second prong tapered end |
| 32 | lower cross member |
| 32a | lower cross member first end |
| 32b | lower cross member second end |
| 34 | first lower cross member collar |
| 36 | second lower cross member collar |
| 38 | first notch |
| 40 | second notch |

Figure 1:
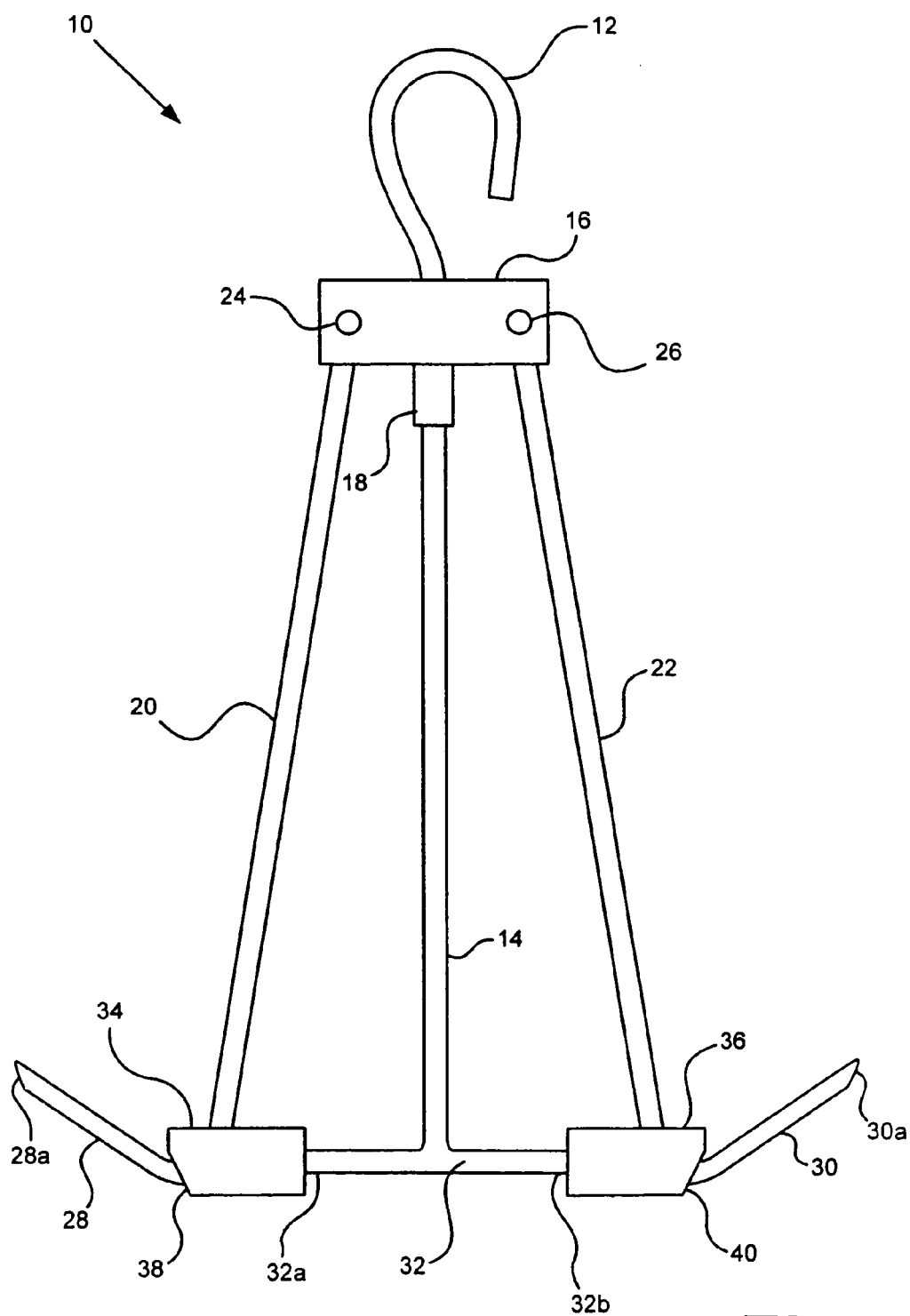
FIG. 1. is a front elevation view of the present invention in a first, retracted position.

Attention is first directed to FIG. 1 which illustrates a gambrel (10) in a first, retracted position. The gambrel (10) has a support hook (12) operable to hang the gambrel (10) by a chain, rope, cable, a stationary object, or other supporting means (not shown). The support hook (12) is connected to the first end (no reference number) of the central bar (14) of the gambrel (10). The central bar (14) extends downwardly when the gambrel (10) is in use.

The gambrel (10) has an upper cross member (16) slidably connected to the central bar (14) via the upper cross member cylinder (18). The upper cross member (16) is comprised of a front plate (16A) and a back plate (16B) (not visible in this view). The gambrel (10) has a first prong arm (20) and a second prong arm (22) connected to the upper cross member (16) via the first prong arm pivot (24) and the second prong arm pivot (26), respectively. The pivots (20 and 22) are weight bearing, and because there are only two, the overall strength of the gambrel (10) is enhanced.

At the distal end of the first prong arm (20) a first prong (28) is attached. At the distal end of the second prong arm (22) a second prong (30) is attached. The first prong (28) and the second prong (30) each have tapered ends (28a and 30a respectively) to allow for easier insertion and withdrawal of the prongs (28 and 30) into the hanging points, such as the hind legs, of the animal to be dressed. The angle of the first prong (28) relative to the first prong arm (20) and of the second prong (30) relative to the second prong arm (22) is set such that a carcass (not shown) may be easily mounted and easily dismounted yet remains securely attached while being dressed. The angle of the first prong (28) and the second prong (30) relative to the horizontal may vary from about 20 degrees to about 85 degrees.

Distal from the support hook (12) and connected to the central bar (14) at its second end (no reference number) is the lower cross member (32). The lower cross member has a first end (32a) and a second end (32b). Attached to the first end (32a) is the first lower cross member collar (34). The first lower cross member collar (34) has an aperture (not shown) through which the first prong arm (20) is slidably connected. The first lower cross member collar (34) may have a first notch (38) in the end opposite of the first end of the lower cross member (32a). Attached to the second end (32b) is the second lower cross member collar (36). The second lower cross member collar (36) has an aperture (not shown) through which the second prong arm (22) is slidably connected. The second lower cross member collar (36) may have a second notch (40) in the end opposite of the second end of the lower cross member (32b).

Figure 2:
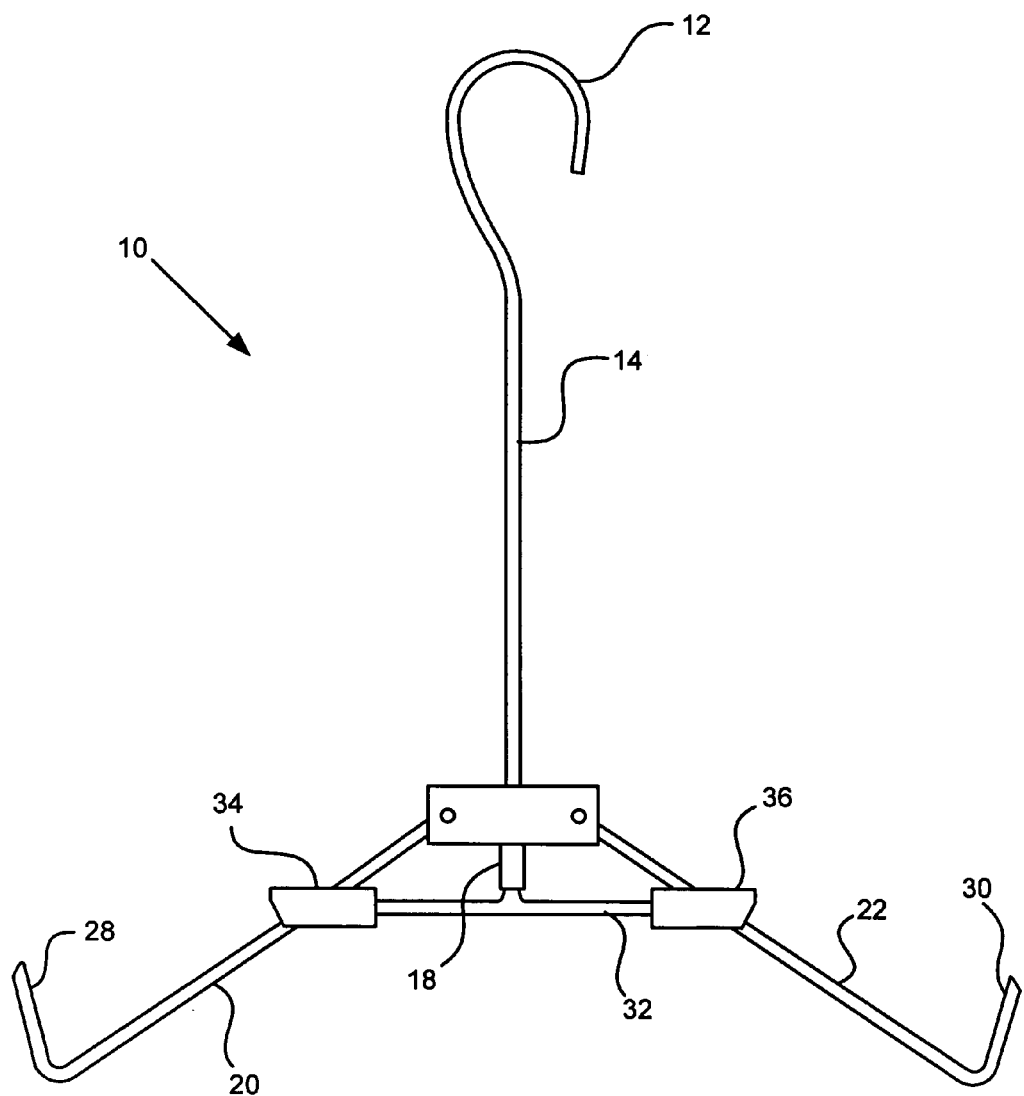
FIG. 2. is a front elevation view of the invention in a second, extended position.

FIG. 2 illustrates the gambrel (10) in a second, fully extended position to support the largest and heaviest animals.

When the gambrel (10) is in use, the upper cross member (16) slides down the central bar (14). Because the lower cross member collars (34 and 36) are attached at a distance from the central bar (14) and the prong arms (20 and 22) are slidably connected to the lower cross member collars (34 and 36) respectively, as the upper cross member (16) slides down the central bar (14) the prong arms (20 and 22) slide through the lower cross member collars (34 and 36) and rotate outwardly from the prong arm pivots (22 and 24). The apertures in the lower cross member collars (34 and 36) are sized to allow this downward and outward movement.

The lower cross member (32) operates as a stopping mechanism for the upper cross member cylinder (18). In this second position, the first prong (28) and the second prong (30) are in nearly vertical position to provide the greatest support for the animal to be dressed. This view further illustrates the upper cross member (16), first prong arm pivot (24), second prong arm pivot (26), first lower cross member collar (34) and second lower cross member collar (36), operating in conjunction to spread the prong arms (20, 22) of the gambrel (10).

If a smaller animal is being dressed, the gambrel (10) will move to a third, intermediate extended position. The weight of the animal on the first prong (28) and the second prong (30) causes the first prong arm (20) and second prong arm (22) to be drawn through the first lower cross member collar (34) and second lower cross member collar (36), respectively. In conjunction with the first prong arm pivot (24) and second prong arm pivot (26), this drawing action causes the prongs to automatically spread to the proper distance depending upon the weight and size of the carcass (not shown). The upper cross member cylinder (18) slidably operates to permit the upper cross member (16) and lower cross member (32) to be brought together.

Figure 3:
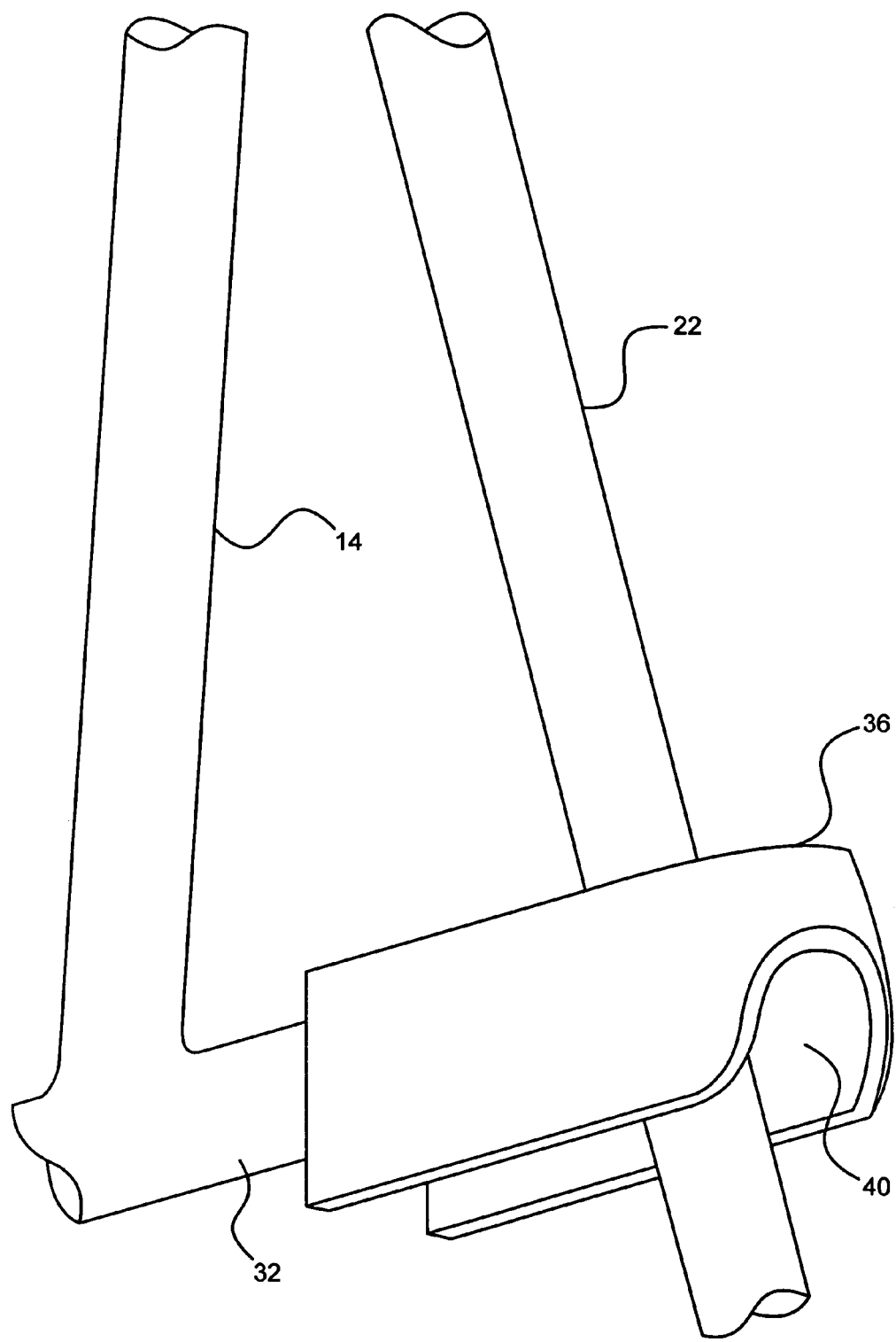
FIG. 3. is an partial, side perspective view of the present invention.

FIG. 3 is an partial, side perspective view of the present invention showing the second lower cross member collar (36). In this view, the second prong arm (22) is shown extending through the second lower cross member collar (36). At the end of the collar (36) is a second notch (40). The second notch (40) permits the second prong arm (22) to spread to its widest position and also operates as a stopping mechanism to prevent the gambrel (10) from spreading too much. The first lower cross member collar (34) and first notch (38) act in the same manner.

Figure 4:
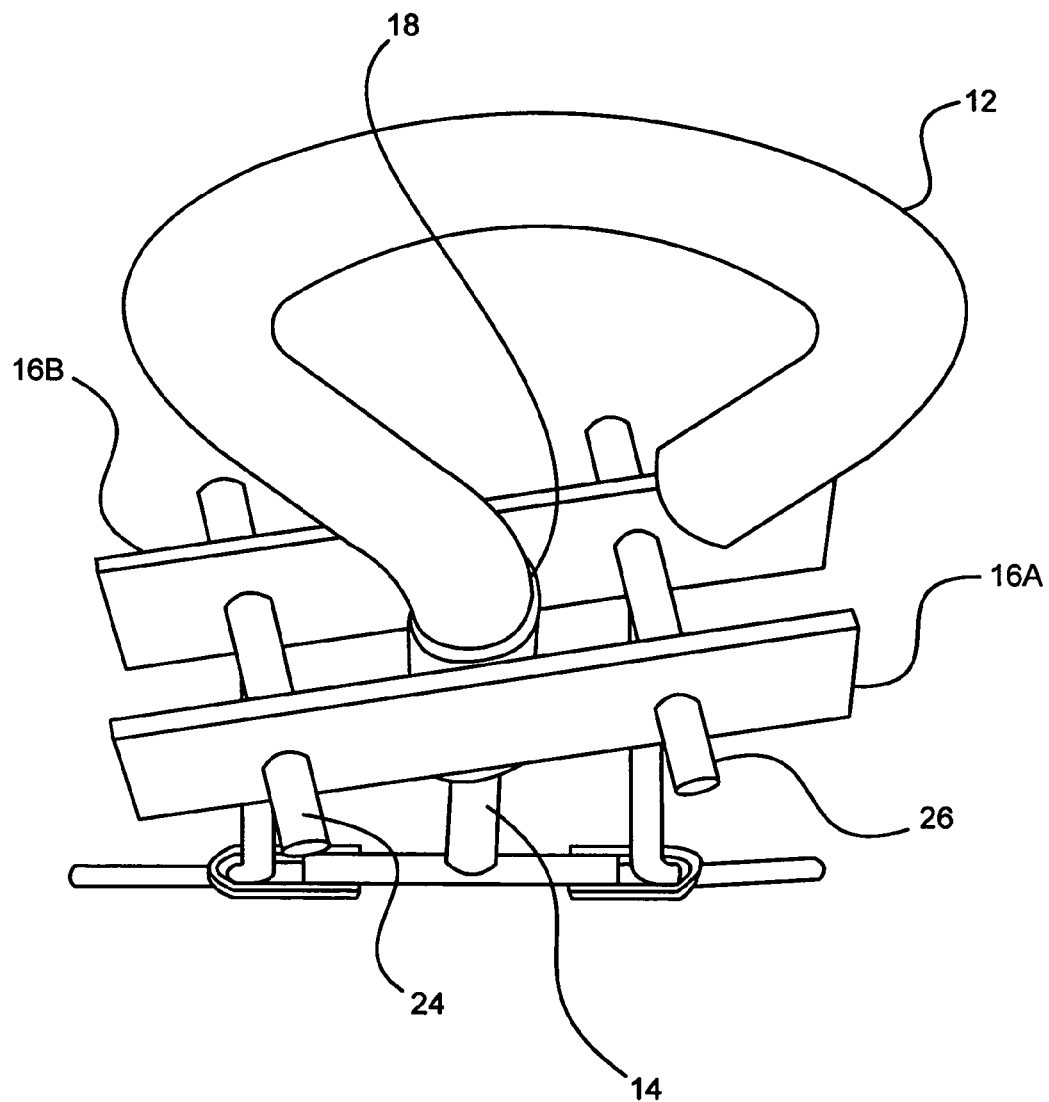
FIG. 4. is a top perspective view of the present invention.

FIG. 4 illustrates the first plate (16a) and second plate (16b) of the upper cross member (16) of the gambrel (10). The first and second upper cross member plates (16a and 16b) are remotely attached opposite each other. The first prong arm pivot (24) and the second prong arm pivot (26) are attached to the first and second upper cross member plates (16a and 16b) generally near the opposite ends of the first and second upper cross member plates (16a and 16b). The pivots (24 and 26) hold the upper cross member plates (16a and 16b) at a fixed distance sized to allow the first prong arm (22) and the second prong arm (22), which are pivotally attached to the first prong arm pivot (24) and the second prong arm pivot (26) respectively, to move between the first and second upper cross member plates (16a and 16b).

Also shown is the upper cross member cylinder (18), which is attached to the first and second upper cross member plates (16a and 16b) generally near the center of the first and second upper cross member plates (16a and 16b). The upper cross member cylinder (18) is generally tubular in shape, and its inner diameter is sized to slidably receive the central bar (14) of the gambrel (10). The central bar (14) is slidably inserted through the upper cross member cylinder (18).

FIGS. 1 and 2 together illustrate the range of the angle of the first prong (28) and the second prong (30) relative to the horizontal. In the gambrel's (10) fully retracted state (FIG. 1), the angle of the first prong (28) and the second prong (30) relative to the horizontal is about 20 degrees. In the gambrel's (10) full expanded state (FIG. 2), the angle of the first prong (28) and the second prong (30) relative to the horizontal is about 85 degrees. The angle of the prongs relative to the horizontal will generally range between 20 degrees and 85 degrees depending upon the size and weight of the carcass (not shown).

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

I claim:

1. A gambrel comprising:
   a central bar slidably attached to an upper cross member, said upper cross member extending outwardly from said central bar;
   a lower cross member attached to a second end of said central bar, said lower cross member extending outwardly from said central bar;
   a prong arm pivot attached to said upper cross member;
   a prong arm pivotally attached to said prong arm pivot, and said prong arm slidably attached to said lower cross member;
   wherein said upper cross member is further comprised of an upper cross member first plate parallel to an upper cross member second plate;
   said upper cross member first plate attached to an end of said prong arm pivot and said upper cross member second plate attached to the opposite end of said prong arm pivot;
   an upper cross member cylinder attached to said upper cross member first plate and to said upper cross member second plate, wherein said upper cross member cylinder is attached between and near the center of said upper cross member first plate and said upper cross member second plate; and
   said upper cross member cylinder is generally tubular in shape, and said upper cross member cylinder's inner diameter is sized to slidably receive said central bar.

2. The gambrel of claim 1, wherein:
   said lower cross member is further comprised of a lower cross member collar attached to a second end of said lower cross member; and
   said prong arm slidably attached to said lower cross member collar.

3. The gambrel of claim 2, further comprising a support hook attached to a first end of said central bar.

4. The gambrel of claim 3, further comprising a prong attached to an end of said prong arm, opposite of said prong arm pivot.

5. The gambrel of claim 4, wherein said prong is attached to said prong arm at an angle of between 20 degrees and 85 degrees, relative to said prong arm.

6. The gambrel of claim 5, wherein said prong has a tapered end opposite said prong arm.

7. The gambrel of claim 2, further comprising a prong attached to an end of said prong arm, opposite of said prong arm pivot.

8. The gambrel of claim 7, wherein said prong is attached to said prong arm at an angle of between 20 degrees and 85 degrees, relative to said prong arm.

9. The gambrel of claim 8, wherein said prong has a tapered end opposite said prong arm.

10. The gambrel of claim 1, further comprising a support hook attached to a first end of said central bar.

11. The gambrel of claim 10, further comprising a prong attached to an end of said prong arm, opposite of said prong arm pivot.

12. The gambrel of claim 11, wherein said prong is attached to said prong arm at an angle of between 20 degrees and 85 degrees, relative to said prong arm.

13. The gambrel of claim 12, wherein said prong has a tapered end opposite said prong arm.

14. The gambrel of claim 1, further comprising a prong attached to an end of said prong arm, opposite of said prong arm pivot.

15. The gambrel of claim 14, wherein said prong is attached to said prong arm at an angle of between 20 degrees and 85 degrees, relative to said prong arm.

16. The gambrel of claim 15, wherein said prong has a tapered end opposite said prong arm.

17. A gambrel comprising:
a central bar having a first end and a second end;
an upper cross member slidably attached to said central bar, said upper cross member having a first end and a second end, said upper cross member having an upper cross member first plate parallel to an upper cross member second plate, wherein said central bar is slidably attached between and generally equidistant from said upper cross member first end and said upper cross member second end, said upper cross member extends outwardly from said central bar, and said upper cross member slides on said central bar between said central bar first end and said central bar second end;
said central bar second end attached to a lower cross member, said lower cross member having a first end and a second end, wherein said central bar is attached between and generally equidistant from said lower cross member first end and said lower cross member second end, and said lower cross member extends outwardly at generally right angles from said central bar;
a first prong arm pivot attached near said upper cross member first end;
a second prong arm pivot attached near said upper cross member second end;
a first prong arm pivotally attached to said first prong arm pivot, and said first prong arm slidably attached to said lower cross member first end;
a second prong arm pivotally attached to said second prong arm pivot, and said second prong arm slidably attached to said lower cross member second end; and
a support hook attached to said first end of said central bar.

18. The gambrel of claim 17, wherein said upper cross member slides on said central bar toward said central bar second end until said upper cross member comes in contact with said lower cross member.

19. The gambrel of claim 17 further comprising:
a first lower cross member collar attached to said lower cross member first end, wherein said first prong arm is slidably attached to said lower cross member first end through said first lower cross member collar; and
a second lower cross member collar attached to said lower cross member second end, wherein said second prong arm is slidably attached to said lower cross member second end through said second lower cross member collar.

20. The gambrel of claim 19 further comprising:
said first lower cross member collar having a first notch opposite said lower cross member first end, wherein said first notch allows said first prong arm to more easily extend outwardly as said first prong arm slides through said first lower cross member collar; and
said second lower cross member collar having a second notch opposite said lower cross member second end, wherein said second notch allows said second prong arm to more easily extend outwardly as said second prong arm slides through said second lower cross member collar.

21. The gambrel of claim 17, wherein said first prong arm is essentially straight and said second prong arm is essentially straight.

22. The gambrel of claim 21, further comprising:
a first prong attached to said first prong arm at an end of said first prong arm opposite of said first prong arm pivot; and
a second prong attached to said second prong arm at an end of said second prong arm opposite of said second prong arm pivot.

23. The gambrel of claim 17, wherein said first prong is essentially straight, and said second prong is essentially straight.

24. The gambrel of claim 23, wherein said first prong is attached to said first prong arm at an angle of between 20 degrees and 85 degrees, relative to said first prong arm, and said second prong is attached to said second prong arm at an angle of between 20 degrees and 85 degrees, relative to said second prong arm.

25. The gambrel of claim 23, wherein said first and second prongs are attached to said first and second prongs at an angle relative to said first and second prongs, and said upper cross member slides along said central bar causing said first and second prong arms to extend sufficiently, such that when a carcass is hung on only one of either said first prong arm or said second prong arm that the carcass will not fall off said first or second prong arm.

26. The gambrel of claim 17, wherein said upper cross member further comprises:
an upper cross member first plate slidably attached to one side of said central bar, said upper cross member first plate having a first end and a second end, wherein said central bar is slidably attached between and generally equidistant from said upper cross member first plate first end and said upper cross member first plate second end;
an upper cross member second plate slidably attached to a side of said central bar opposite said upper cross member first plate, said upper cross member second plate having a first end and a second end, wherein said central bar is slidably attached between and generally equidistant from said upper cross member second plate first end and said upper cross member second plate second end;
wherein said first prong arm pivot is disposed between said upper cross member first plate and said upper cross member second plate; and
wherein said second prong arm pivot is disposed between said upper cross member first plate and said upper cross member second plate.

* * * * *